United States Patent [19]

Dorsett et al.

[11] 4,366,612

[45] Jan. 4, 1983

[54] METHOD OF FASTENING A FIRST SHELL TO A SECOND SHELL WITH A DIAPHRAGM BEAD THEREBETWEEN

[75] Inventors: Henry Dorsett, LaPorte; Michael E. Gatt, Osceola, both of Ind.

[73] Assignee: The Bendix Corporation, Southfield, Mich.

[21] Appl. No.: 219,078

[22] Filed: Dec. 22, 1980

[51] Int. Cl.³ .................. B23P 19/04; B21D 39/00; B23P 11/02
[52] U.S. Cl. ........................... 29/454; 29/508; 29/510; 92/98 D; 138/30
[58] Field of Search ............... 29/510, 454, 407, 511, 29/508, 157 R, 156.4 R; 92/98 D; 138/30

[56] References Cited

U.S. PATENT DOCUMENTS

| | | | |
|---|---|---|---|
| 2,891,362 | 6/1959 | Bettridge | 29/511 UX |
| 3,158,930 | 12/1964 | Wesstrom et al. | 29/510 |
| 3,981,227 | 9/1976 | Azuma | 92/98 D X |
| 4,268,945 | 5/1981 | Von Arman et al. | 29/156.4 R X |
| 4,295,492 | 10/1981 | Zahid | 138/30 |
| 4,296,680 | 10/1981 | Ohta et al. | 92/98 D |
| 4,303,006 | 12/1981 | Burke et al. | 92/98 D |

Primary Examiner—Charlie T. Moon
Attorney, Agent, or Firm—Leo H. McCormick, Jr.; Ken C. Decker

[57] ABSTRACT

A method of fastening a first shell to a second shell to form a housing. The first shell which has a radial wall with a projection adjacent its peripheral surface is positioned in a fixture. A bead on a diaphragm assembly is located in a groove in the projection. The opened end of an annular wall on the second shell is placed around the bead and peripheral surface. The second shell is moved toward the first shell until the peripheral surface contacts a stop on the second shell. Thereafter, the opened end of the second shell is crimped into engagement with the radial wall to hold the peripheral surface in engagement with the stop. The fixture is rotated while a tool is brought into contact with the annular wall. The tool deforms the wall by creating a rib that radially compresses the bead into the groove and seals the housing.

7 Claims, 4 Drawing Figures

METHOD OF FASTENING A FIRST SHELL TO A SECOND SHELL WITH A DIAPHRAGM BEAD THEREBETWEEN

BACKGROUND OF THE INVENTION

This invention relates to a method of fastening a first shell to a second shell to form a sealed housing.

Devices for fastening shells together have been proposed. They are of the type shown in U.S. Pat. Nos. 3,158,930 and 3,977,299. In these fasteners, a bead on a diaphragm is urged into contact with a preformed shoulder on an annular wall of a first shell. Tabs on a second shell are positioned in slots in the first shell which prevent rotation between the first and second shells. When the tabs engage the bottom of the slots, the annular wall on the first shell is crimped to hold the bead against the shoulder and seal the housing.

As long as the dimensions of the bead of the diaphragm, depth of slots and position of the shoulder are made to specification, this seal is adequate. Unfortunately, tolerances are permitted for each component. If the individual parts are at opposite tolerance limits, an additive effect may occur and under some condition, the seal leaks.

SUMMARY OF THE INVENTION

In the present invention, a method of fastening a first shell to a second shell reduces the possibility of leak paths at the connection forming the wall of the second shell to compress the bead on the diaphragm into a groove after the crimping operation. The deforming is performed by rotating the fixture on which the first and second shells are placed after the end of the second shell is crimped over the first shell while a tool applies a constant force to create a rib that extends into the bead on the diaphragm to provide a radial force that holds the bead in compression. This compressive force holds the bead tight against the groove to eliminate relative rotation between the first and second shells.

An advantage of this invention resides in the deformation that is put into the annular wall after the crimping operation to urge the bead on the diaphragm assembly into sealing engagement with the first and second shells. Any leak which is detected after the initial deformation of the annular wall can easily be corrected by increasing the deformation to adequately flow the bead into the groove to achieve the desired sealing.

Another advantage of this invention occurs since the frictional resistance between the bead, rib and groove is sufficient to prevent relative movement between the first and second shell, thereby eliminating the need for slots and tabs as in the prior art.

It is therefore, an object of this invention to provide a method of fastening a first shell to a second shell by a crimping and deformation operation to seal the interior thereof from the surrounding environment.

These advantages and objects should be apparent from reading this specification while viewing the drawings.

DETAILED DESCRIPTION OF THE INVENTION

Figure 1:
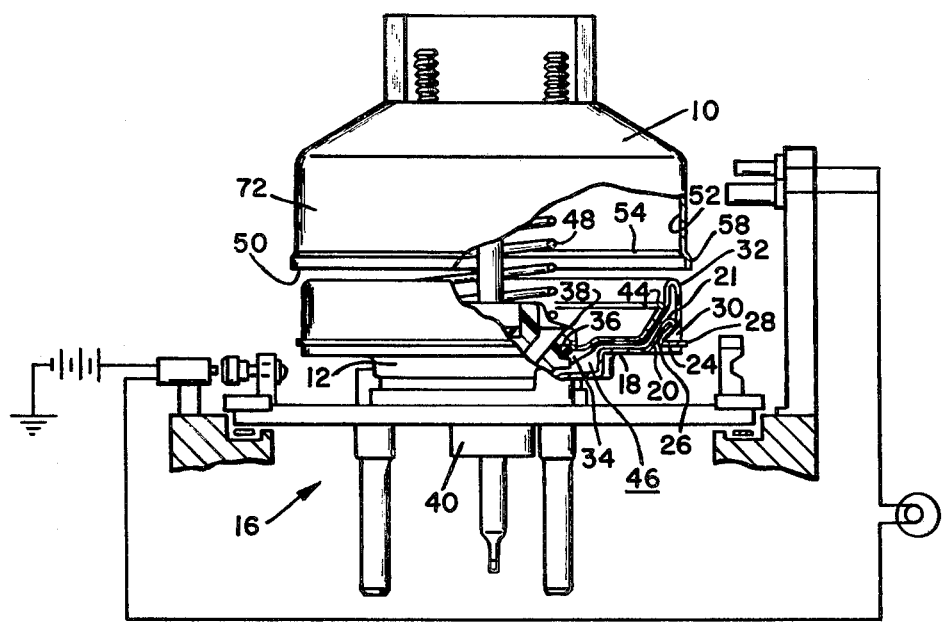
FIG. 1 is a schematic illustration of a first shell, a diaphragm assembly and a second shell with a sectional view of the components through which the first and second shells are fastened together by the method of this invention to form a sealed housing for a servomotor.

The servomotor shown in the drawings is assembled in a manner similar to that disclosed in U.S. Patent application Ser. No. 45,713, filed June 5, 1979, now U.S. Pat. No. 4,268,945, issued May 26, 1981, with the exception of the fastening of the first shell 10 to a second shell 12.

As shown in FIG. 1, the second shell 12 is placed on a fixture 16. The second shell 12 has a radial wall 18 with a conical section 20 projecting therefrom. A flange 24 is rolled back from the conical section to produce a groove 26. The peripheral edge 28 of the flange section 24 is at a substantially fixed radius from the axis of the second shell 12.

The first bead 30 of diaphragm 32 snaps into groove 26 and a second bead 34 is positioned in groove 36 on hub 38 to hold backing plate 44 on hub 38. Hub 38 which retains the valve, not shown, for controlling the operation of the resulting servomotor, has a projection 40 that extends through an opening in shell 12. The hub 38, diaphragm 32, and shell 12 cooperate to define a chamber 46.

When the hub 38 and bead 30 of diaphragm 32 are attached to shell 12, a spring 48 is placed on the hub 38. Thereafter, the first shell 10 is aligned with second shell 12. A force is applied to the first shell 10 to move peripheral surface 50 into engagement with diaphragm 32. The lip 21 and the thickness of diaphragm 32 are selected such that the dimension of bore 52 adjacent shoulder 54 passes over the bead 30 of diaphragm 22 without binding.

Figure 2:
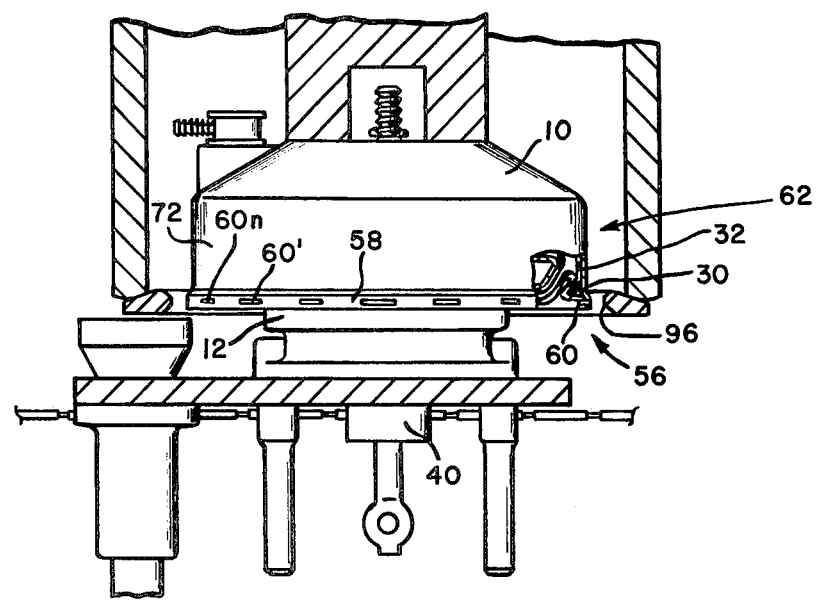
FIG. 2 is a schematic illustration of the first and second shells in a crimper apparatus.

When peripheral surface 28 engages shoulder 54, a crimping apparatus 56 of the type disclosed in U.S. Pat. No. 3,158,930 is brought into engagement with wall 58. As shown in FIG. 2, tangs 60, 60' . . . $60_n$ are punched in wall 58. The tangs 60, 60' . . . $60_n$ engage flange 24 to hold the flange 24 against shoulder 54, as shown in FIG. 2, and thereby connect the first shell 10 with the second shell 12 to form housing 62.

Figure 3:
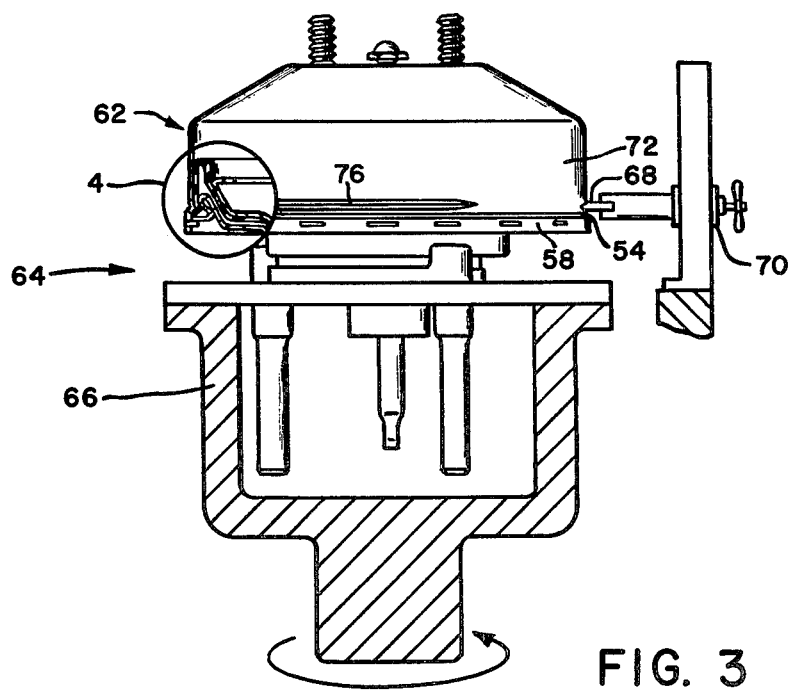
FIG. 3 is a schematic illustration of the housing after crimping in a deforming apparatus.

The housing 62 is removed from fixture 16 and placed on a second fixture 64 shown in FIG. 3. Fixture 64 may be independent from a production line of the type disclosed in U.S. Patent application Ser. No. 911,848 or the final assembly station.

Figure 4:
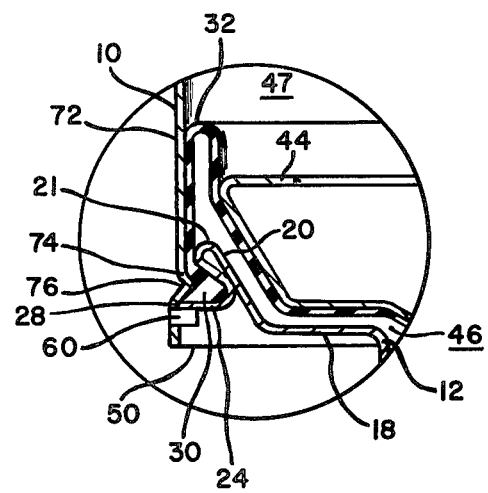
FIG. 4 is a sectional view taken along circumscribed section 4 of FIG. 3 showing the relationship between the first and second shells and diaphragm after being subjected to deformation.

When housing 62 is fixed to base 66 an input signal is transmitted to the motor which rotates base 66. Thereafter, an end wheel 68 on tool 70 is brought into engagement with the side wall 72 adjacent shoulder 54. Movement of tool toward servomotor housing 62 continues until groove 76 developes in the side wall 72 as shown in FIG. 4. The formation of groove 76 creates an annular rib 74 on the interior 52 of wall 72 that compresses bead 30 causing the bead 30 to flow toward and into groove 26 to seal chambers 46 and 47 from each other and the surrounding environment in a manner as best shown in FIG. 4. The compressionary force of the rib 74 on the bead 30 can be changed by changing the size and depth of groove 76.

For example, if the quality test disclosed in U.S. Patent application Ser. No. 911,848, filed June 2, 1981, now U.S. Pat. No. 4,175,070, issued Nov. 20, 1979, indicates the potential for a leak path through the connection which could be caused by dimensional extremes, eccentric shells, or the bead on the diaphragm undersized with respect to the groove of the end plate, an unacceptable servomotor could be placed in fixture 64 and groove 76 increased to create a larger rib 74 and thereby compensate for such nonmatching of parts even though they individually meet their particular manufacturing standards.

In some instances, it may not be necessary to deform the entire annular surface of wall 72. It is possible that an attachment could be added to punch 96 on crimping apparatus 56. However, it is felt that the grooving fixture or tool 70 shown in FIG. 3 provides a more positive seal.

In addition, the deformation of wall 72 may not be necessary if a bead expanding solution were applied to diaphragm. Several solutions, such as brake fluid, have been applied to bead 30 after the crimping operation to expand or swell the bead into the groove 64 and thereby seal the servomotor housing 62. Such rubber expanders do adequately swell the bead and seal the chambers. Unfortunately, such rubber expanders can cause the flexibility of the diaphragm to be reduced. Therefore, while there may be other methods of forming the seal for the housing 62, it appears that the annular rib 74 which compresses the bead 30 provides the best quality control for the mass production of servomotors.

We claim:

1. In a method of fastening a first shell to a second shell to form a housing by crimping a first peripheral surface on the first shell around a second peripheral surface on the second shell to axially compress a bead on a diaphragm between the first and second shell to seal the interior of the housing from the surrounding environment, the improvement comprising the steps of:
   deforming said first shell over said bead adjacent said crimping to radially compress said bead toward said second shell to compensate for any dimensional differences between said first and second shells and bead that may affect the development of said seal.

2. In the method recited in claim 1 wherein said deforming is characterized by an annular groove that produces a rib which extends into said bead.

3. In the method as recited in claim 2 characterized in that said rib engages said bead to prevent rotative movement between the first and second shells.

4. In the method as recited in claim 3 wherein said deforming includes the steps of:
   rotating said first shell while moving a tool toward said first shell; and
   applying a force to said tool during the rotation to produce said groove.

5. A method of fastening a first shell to a second shell comprising the steps of:
   placing a first shell on a fixture, said first shell having a radial wall with a groove located in a projection adjacent its peripheral surface;
   positioning a bead of a diaphragm assembly in said groove to define a first chamber between said radial wall and the diaphragm assembly;
   placing a second peripheral surface on an opened end of an annular wall of said second shell over said bead to surround said first peripheral surface of said first shell, said second shell and diaphragm assembly defining a second chamber;
   moving said second shell toward said first shell until said first peripheral surface engages a stop on said second shell;
   crimping said second peripheral surface into engagement with said wall to hold said first peripheral surface in engagement with the stop; and
   deforming said annular wall over said bead adjacent said stop to urge said bead on the diaphragm assembly into said groove to seal said first and second chamber from each other and the surrounding environment.

6. The method as recited in claim 5 wherein said deforming includes the steps of:
   moving the crimped first and second shells to a second fixture;
   rotating said second fixture while moving a tool into engagement with said annular wall adjacent said stop; and
   applying a uniform force to the annular wall through the tool to form a rib on the interior of the annular wall that radially compresses the bead into the groove on the projection on the radial wall of the first shell.

7. The method as recited in claim 6 wherein the compressed bead engages the rib and the groove to prevent relative movement between the first and second shells.

* * * * *